A. C. HERTZFELDT.
VEHICLE SEAT.
APPLICATION FILED FEB. 12, 1917.

1,227,437.

Patented May 22, 1917.
2 SHEETS—SHEET 1.

Inventor
A. C. Hertzfeldt
By C. A. Snow & Co.
Attorneys

Witnesses

A. C. HERTZFELDT.
VEHICLE SEAT.
APPLICATION FILED FEB. 12, 1917.
1,227,437.
Patented May 22, 1917.
2 SHEETS—SHEET 2.
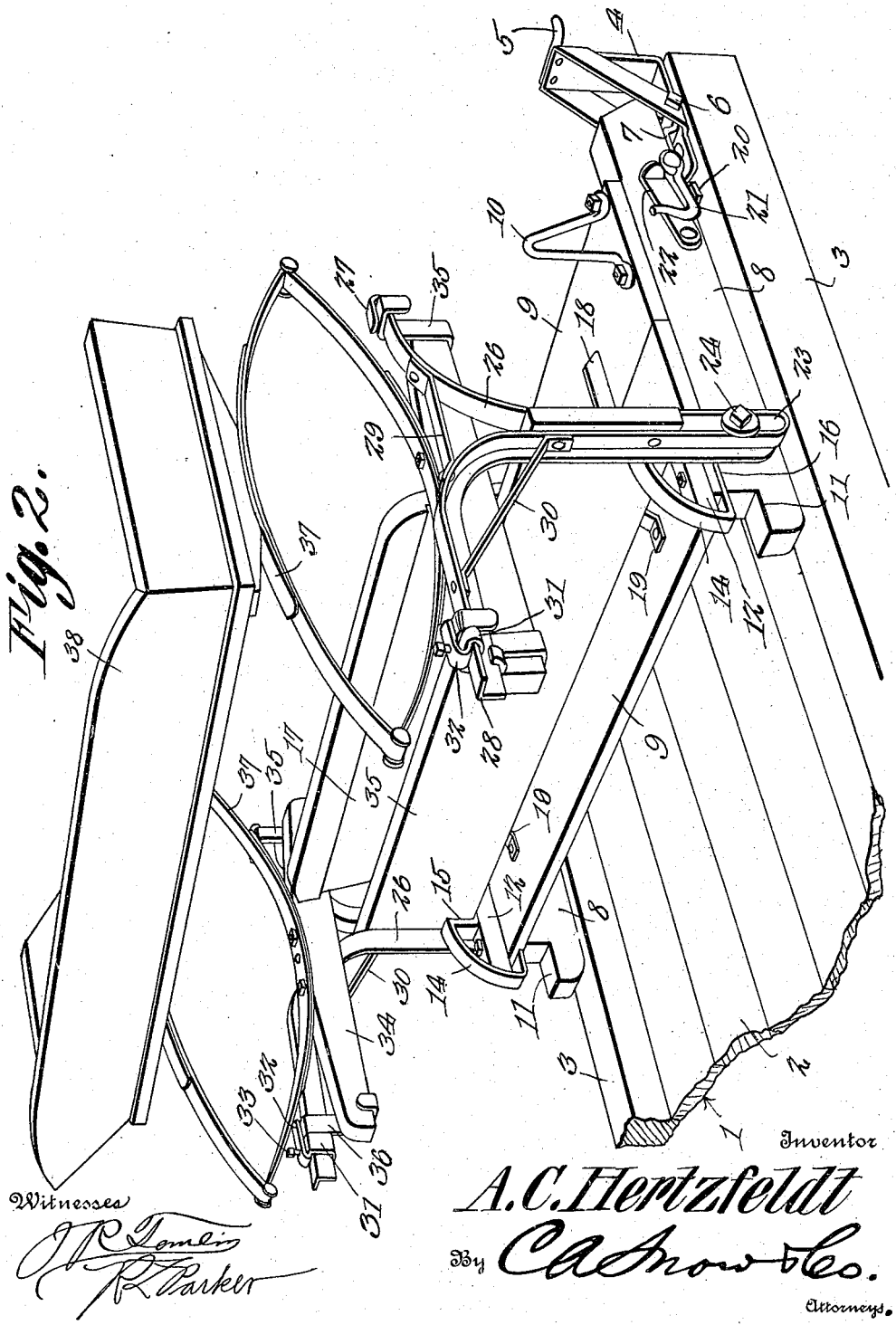
Inventor
A. C. Hertzfeldt
By C. A. Snow & Co.
Attorneys.
Witnesses

UNITED STATES PATENT OFFICE.

ALBERT C. HERTZFELDT, OF INDEPENDENCE, WISCONSIN.

VEHICLE-SEAT.

1,227,437.

Specification of Letters Patent.

Patented May 22, 1917.

Application filed February 12, 1917. Serial No. 148,151.

*To all whom it may concern:*

Be it known that I, ALBERT C. HERTZFELDT, a citizen of the United States, residing at Independence, in the county of Trempealeau and State of Wisconsin, have invented a new and useful Vehicle-Seat, of which the following is a specification.

This invention aims to provide a novel means whereby a seat may be so assembled with a wagon platform, that practically the entire length of the platform will be available for receiving a load, it being possible to move the seat into a lowered position when there is no load on the wagon platform.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 2 is a perspective view illustrating the parts as they will appear when there is no load on the wagon platform and when the seat has been lowered.

Figures 1, 3:
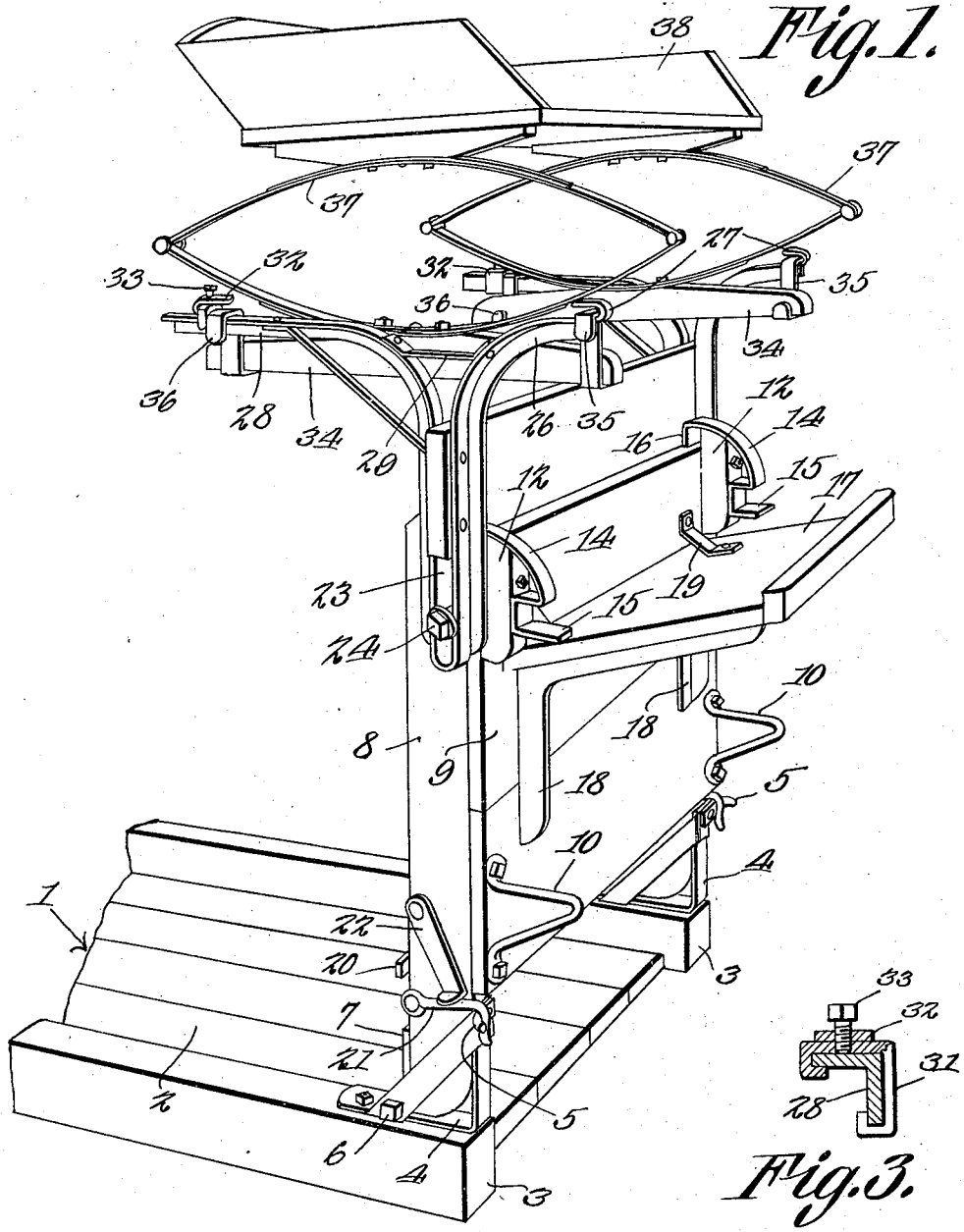
Figure 1 shows in perspective, a device constructed in accordance with the present invention, the parts being in the positions which they will assume when there is a load on the wagon platform and when the seat is elevated.
Fig. 3 is a detailed cross section showing a slide which is used for retaining the seat in place.

In the drawings, the numeral 1 indicates a wagon platform including bottom boards 2 and side sills 3. Brackets 4 are secured to the forward ends of the sills 3 and have laterally extended fingers 5. The brackets 4 carry pivot bolts 6 received in hinge plates 7 attached to the rear edges of bars 8 united by a platform 9. The forward edges of the bars 8 carry steps 10 whereby the structure may be ascended readily. In the upper ends of the bars 8 notches 11 are formed. Secured to the forward face of the platform 9 near to the upper ends of the bars 8 are spacing blocks 12. Curved strips 14 rest on the upper ends of the blocks 12 and are bent at their forward lower ends to form sockets 15, the rear ends of which abut against the forward edges of the blocks 12. The rear ends 16 of the strips 14 are engaged and held between the ends of the platform 9 and the forward edges of the bars 8. The parts 15 of the strips 14 coöperate with the notches 11 to form sockets. A foot rest 17 projects forwardly from the platform 9 and is held thereto by brackets 18 and braces 19. Near to their lower ends and upon their rear edges, the bars 6 are supplied with stops 20. Latches 21 are mounted to swing on the bars 8 below the tops 20, the latches projecting forwardly. The upper ends of keepers 22 are pivoted to the outer faces of the bars 8 above the stops 20.

U-shaped supports 23 are supplied, and pivot bolts 24, engaged with the bars 6, pass through the supports 23 near to the lower ends of the supports. The supports 23 can swing on the pivot bolts 24 and can slide longitudinally thereon in a vertical direction. The supports 23 are united by a connection in the form of a plate 25. The supports 23 comprise forward arms 26 terminating in rearwardly extended hooks 27, and rear arms 28 which are straight and have no hooks. The arms 26 and 28 are united by ties 29, and braces 30 sustain the arms 28 of the supports 23. Mounted to reciprocate on the rear arms 28 are slides 31 having forwardly presented overhanging fingers 32. Set screws 33 are threaded into the fingers 32 and into the slides 31 and are adapted to bear on the rear arms 28.

Side bars 34 are provided, the same having outwardly extended hooks 35 at their forward ends, engaged with the arms 26 and coöperating with the hooks 27. The side bars 34 have similar hooks 35 engaged over the arms 28 near to the rear ends thereof. Springs 37 are mounted on the side bars 34 and carry a seat 38.

In Fig. 1 of the drawings, the seat 38 is shown in the elevated position which it will assume when there is a load on the platform 1, practically the entire length of the platform being available to receive the load. With the conditions above mentioned, the coöperation between the various parts of the structure is as follows:—

The bars 8 stand in vertical positions and abut against the forward portions of the brackets 4. The hook-shaped latches 21 are engaged with the fingers 5 of the bracket 4, and consequently, the bars 8 cannot swing rearwardly and downwardly. The keepers 22 hang in depending positions and bear at their lower ends on the latches 21. The latches 21 therefore cannot be accidentally disengaged from the fingers 5. The foot rest 17 is disposed in a substantially horizontal position, and the structure may be ascended by means of the steps 10. The lower edge of the connection or plate 25 is received in the sockets formed by the notches 11 and the ends 16 of the strips 14. Thus, the plate 25 is vertically disposed, and the seat 38 assumes a horizontal position. In mounting the seat 38 in place, the seat, together with the springs 37 and side bars 34 are pushed forwardly, the hooks 35 and 36 sliding, respectively, along the arms 26 and 28. When the hooks 35 abut against the forward portions of the hooks 27, the slides 31 are moved forwardly on the arms 28 until they coact with the hooks 36, whereupon the set screws 33 are tightened down, to prevent the slides from moving rearwardly. The seat 38 will not slide forwardly, because the hooks 35 are engaged by the hooks 27. The seat 38 will not slide rearwardly, because the hooks 36 are engaged by the slides 31, the latter being held in place by the set screws 33. The seat 38 cannot tilt vertically, because the upper ends of the hooks 27 overhang the hooks 35, and because the fingers 32 of the slides 21 overhang the hooks 36.

Let it be supposed that the load has been removed from the wagon platform 2 and that it is desired to arrange the structure as shown in Fig. 2. Then the seat 38 is pulled upwardly, such operation being possible, because the supports 23 are mounted for vertical movement on the pivot bolts 24. When the seat 38 is moved upwardly, the lower edge of the connection or plate 25 is detached from the sockets 11—16. The seat 38 and the supports 23 may be swung forwardly and downwardly on the bolts 24, and then the supports 23 may be slid rearwardly on the bolts 24 until the lower edge of the plate 25 is received in the sockets 15. The keepers 22 are disengaged from the latches 21 and are swung rearwardly onto the stops 20. The hooks 21 are disengaged from the fingers 5 and may also be swung rearwardly on the stops 20. The bars 8 are swung rearwardly and downwardly, the same pivoting on the bolts 6, and the bars 8 ultimately resting on the side sills 3. The supports 23 now stand vertically, and the seat 38 is horizontally disposed, the same having been lowered and moved rearwardly. The foot rest 17 upstands beneath the seat 38, and the platform 9 becomes a foot rest.

Having thus described the invention, what is claimed is:—

1. The combination with a wagon platform, of rearwardly swinging bars pivoted thereto, one of the bars being provided at its upper end and on its forward edge with separate sockets; supports; a seat carried thereby; means for connecting the supports with the bars for swinging movement and for sliding movement in the direction of the length of the supports; and means carried by one support for engaging the sockets selectively, at the will of an operator.

2. The combination with a wagon platform, of rearwardly swinging bars pivoted thereto and provided at their upper ends and on their forward edges with separate sockets; supports; a seat carried thereby; means for connecting the supports with the bars for swinging movement and for sliding movement in the direction of the length of the supports; and a connection uniting the supports, the connection being receivable in the sockets selectively, at the will of an operator.

3. The combination with a wagon platform, of rearwardly swinging bars pivoted thereto; supports; a seat carried by the supports; means for connecting the supports with the bars for swinging movement and for movement in the direction of the lengths of the supports; and interengaging elements on one of the supports and on one of the bars for holding the supports alined with the bars and at right angles to the bars, at different times.

4. The combination with a wagon platform, of swinging bars pivoted thereto and adapted to rest on the platform; means for holding the bars in upstanding relation with respect to the platform; supports mounted on the bars for swinging movement and for sliding movement in the direction of the lengths of the supports; a seat carried by the supports; and interengaging elements on one of the supports and on one of the bars for holding the supports alined with the bars and at right angles to the bars, at different times.

5. The combination with a wagon platform, of bars mounted to swing thereon and adapted to rest on the platform; means for holding the bars in upright positions with respect to the platform; separate sockets carried at the upper ends of the bars and on the forward edges of the bars; supports; a seat carried thereby; means for connecting the supports with the bars for swinging movement and for sliding movement in the direction of the length of the supports; and means carried by one of the supports for engaging the sockets at different times.

In testimony that I claim the foregoing as my own, I have hereto affixed my signature in the presence of two witnesses.

ALBERT C. HERTZFELDT.

Witnesses:
J. A. MARKHAM,
WALTER H. HERTZFELDT.

Copies of this patent may be obtained for five cents each, by addressing the "Commissioner of Patents, Washington, D. C."